Dec. 26, 1939.  R. TAMPIER  2,185,160
DEVICE FOR ACTUATING THE CONTROLS ON AIRCRAFT
Filed Feb. 1, 1939  4 Sheets-Sheet 1

Inventor
René Tampier
by
Attorney

Dec. 26, 1939.   R. TAMPIER   2,185,160
DEVICE FOR ACTUATING THE CONTROLS ON AIRCRAFT
Filed Feb. 1, 1939    4 Sheets-Sheet 2

Inventor
René Tampier
by
*A. Knight Stewart*
Attorney

Dec. 26, 1939.    R. TAMPIER    2,185,160
DEVICE FOR ACTUATING THE CONTROLS ON AIRCRAFT
Filed Feb. 1, 1939    4 Sheets-Sheet 3
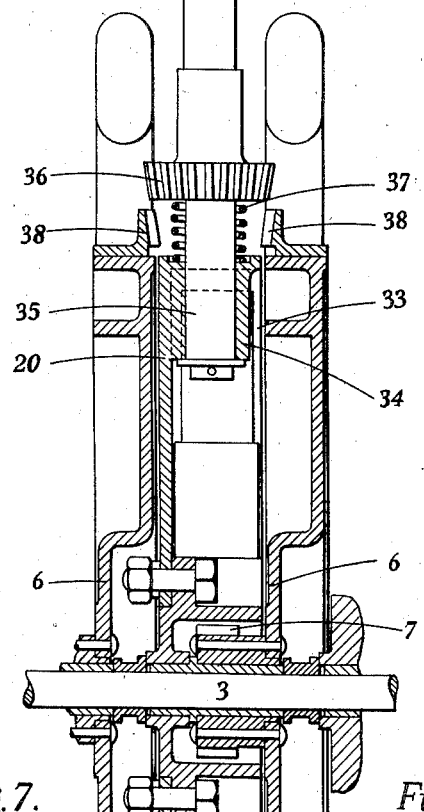
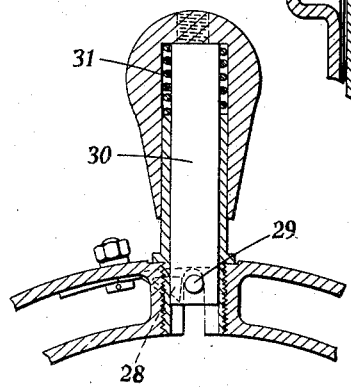
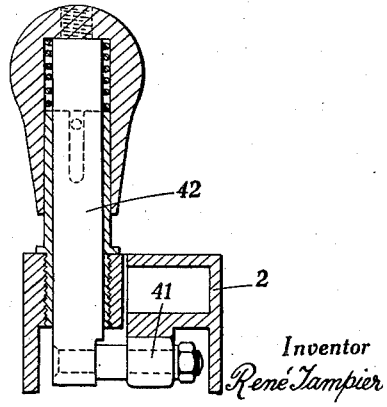
Inventor
René Tampier
by
*A. Knight Cerone*
Attorney Dec. 26, 1939.   R. TAMPIER   2,185,160
DEVICE FOR ACTUATING THE CONTROLS ON AIRCRAFT
Filed Feb. 1, 1939   4 Sheets-Sheet 4

Inventor
René Tampier
by
Attorney

Patented Dec. 26, 1939

2,185,160

UNITED STATES PATENT OFFICE 2,185,160

DEVICE FOR ACTUATING THE CONTROLS ON AIRCRAFT

René Tampier, Boulogne-sur-Seine, France

Application February 1, 1939, Serial No. 254,051
In Great Britain February 5, 1938

11 Claims. (Cl. 74—471)

This invention relates to devices for actuating the controls on aircraft.

The usual method of actuating the controls on aircraft; for example, the controls of the carburetter, is by means of levers arranged to move through an angle which does not exceed approximately 90°.

In the case of big machines where great loads are imposed on the controls, it is not practicable to provide a lever of sufficient length to enable said controls to be actuated with reasonable effort; further, engines of very high power are frequently mounted at a considerable distance from the fuselage and unless care is exercised in moving the throttle control levers, a sudden acceleration to a maximum may prove a danger to the wing structure on which the engines are mounted, particularly when the engines are being tested on the ground.

The primary object of the present invention is to provide a device by means of which the required movement of the controls may be effected in a series of steps, each of which involves little effort.

Other objects of the present invention are to provide means for braking the operating lever or handle so that when the pilot moves his hand from one handle to another the first mentioned handle remains in the same position; to provide means for arresting or predetermining the extent of movement of one handle or lever and to provide means by which a handle may be released from and moved beyond the point of arrestment; to provide means for enabling two engines, mounted at an equal distance from the fuselage, to be controlled differentially; to provide means for automatically shortening the handles at predetermined points, and to provide means for automatically turning the handles on their axes at predetermined points.

A device for actuating controls on aircraft made according to the present invention comprises a shaft arranged at right angles to the longitudinal axis of the machine, a plurality of hand wheels, each operating a separate control, mounted on said shaft, means for operating each of said hand wheels in a stepwise manner, said means comprising a plurality of operating handles projecting radially from each of said operating members, a fixed member disposed adjacent to each rotatably mounted operating member, and an operating connection between each rotatably mounted operating member and a controlled element for transmitting the rotary movement of the said operating member as a linear movement.

Means comprising a friction element, supported on the adjacent fixed member and acting on each hand wheel, may be provided for holding any one hand wheel in the position into which it is moved.

Means comprising stops carried on the fixed members and adapted to co-operate respectively with stops carried on the hand wheels may be provided for arresting the movement of the hand wheels at any desired point. Means may be provided for releasing the stop-mechanism, these means comprising a slidable part on the hand wheel by means of which the stops are brought out of alignment.

When the device according to the invention is intended for use in aircraft powered by two engines, means may be provided for operating the two engines simultaneously either differentially or in the same way. These means may comprise an intermediate gear movably carried on the adjacent fixed member and adapted to be brought into mesh with gearing provided on two adjacently disposed hand wheels, the operation of the intermediate gear then operating the two hand wheels in opposite directions.

Means may be provided for automatically sliding the handles on the hand wheels inwards when they reach the predetermined position, whereby when groups of hand wheels are arranged on parallel shafts the handles projecting therefrom are automatically slidden radially inwards when passing the spindle on which another group of hand wheels is mounted. This arrangement permits of accommodating groups of hand wheels in a minimum space.

The hand wheels may be mounted on spindles a cam slot and pin connection being provided between each hand wheel and spindle whereby on being drawn inwards the handles on the wheels are rotated around their spindles.

In the accompanying drawings which illustrate how the invention may be carried into effect;

Figures 4, 5 and 6 are detail views of parts shown in Figure 3, and Figures 7, 8, 8a and 9, 9a are detail views of modifications which may be included in the apparatus.

Figure 1:
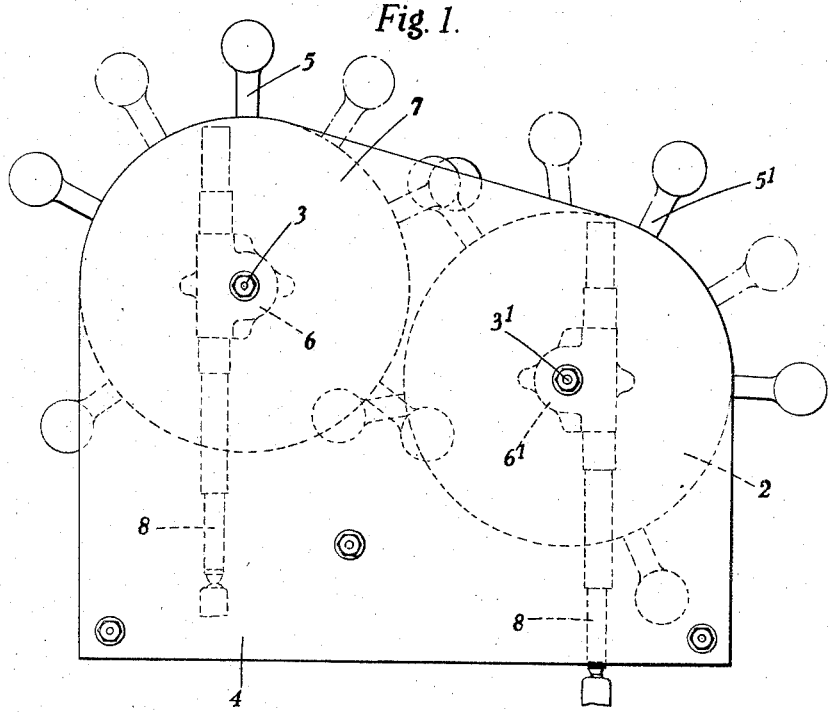
Figures 1 and 2 are respectively side and end elevations of apparatus according to the intention, mounted in a casing.

In the drawings, the apparatus consists of two series 1, 2 each of four, spoked hand wheels, of which the series 1 is rotatably mounted on a common shaft 3, and the series 2 is rotatably mounted on a common shaft 3¹, the shafts 3 and 3¹ being arranged at right angles to the longitudinal axis of the machine in fairly close parallel relationship, and mounted in a casing consisting of side plates 4, 4¹ bolted together. The spoked wheels 1 may be the throttle controls and the spoked wheels 2 may be the airscrew controls. The spokes of the wheels 1, 2 extend beyond the peripheries of the wheels and constitute the operating levers 5, 5¹ by means of which the pilot rotates the wheels on which they are carried for the purpose of operating stepwise the various controls of an aircraft. Each wheel 1, 2 has a hub 6 or 6¹ which carries or is formed with a pinion or like toothed member 7 in permanent mesh with a cylindrical rack 8, a separate rack 8 being provided for each wheel. The toothed members 7 and racks 8 may be replaced by pulleys and cables, chains or the like, or other mechanical means for converting the rotary movement of a wheel into a linear movement.

Figure 3:
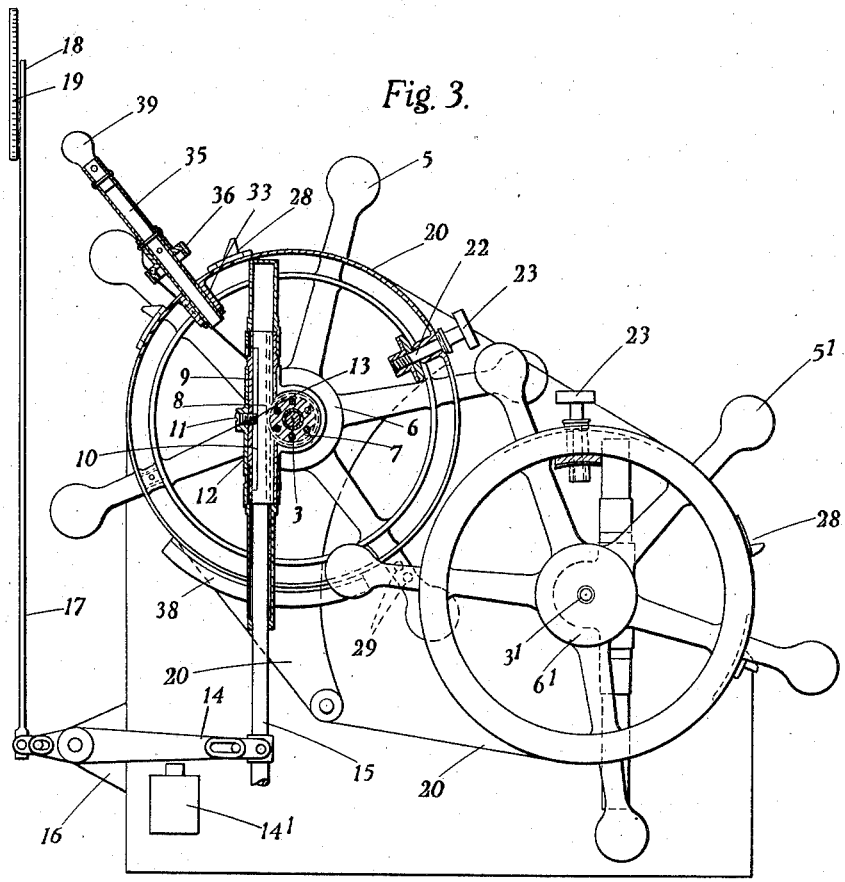
Figure 3 is a more detailed side view, with the near cover plate removed, showing various modifications that may be adopted.

Since in a rack and pinion device for converting the rotary movement of the hub or wheel into linear movement of a rod or cable there may exist or develop a degree of back-lash it is proposed, as shown in Figure 3, to mount each rack in an eccentrically mounted member 9, a slot 10 being provided in the gear face of the rack 8 with which the end of a set screw 11 mounted in the fixed part 12 of the casing is adapted to engage, said set screw 11 passing through a slot 13 provided in the eccentrically mounted member 9 so that when the latter is turned to vary the position of the rack relatively to the pinion 7, said rack is prevented from turning.

As in some cases it may be necessary to move a control wheel through more than one revolution, it is advantageous to provide means for indicating to the pilot the position of the control. Suitable means for this purpose are shown in Figure 3, in which figure one end of a lever 14 is mounted on the rod 15, actuated by the rack 8. The lever 14 is pivoted adjacent its other end to a bracket 16 mounted on the casing or other fixed part, and is connected at its other end to a rod or part 17 arranged to actuate an index mark or member 18 disposed in front of a suitably formed scale 19.

When it is desired to provide means for giving a warning to the pilot, for example, that the under-carriage is not in the desired position, the lever 14 actuating the indicator device may, if desired, be arranged to coact at the end of its travel with an electrical switch device 14¹, or a separate lever or other suitable means actuated by the hub or wheel may be employed for this purpose.

With the control levers or handles, 1, 2 arranged in the manner above described, it is only necessary for the pilot to move his hand the distance existing between two levers or handles, which distance can be set in accordance with some specially required position, such as "slow-running", "cruising speed" or "take-off". The levers or handles may, if desired, be of different length and/or of different colour.

In the form described two sets of control levers or handles are mounted in planes parallel with and in close proximity to each other so that the pilot may, if necessary move one or more of said sets together. However only a single group or set of control levers, or more than two groups or sets, may be employed.

Figure 2:
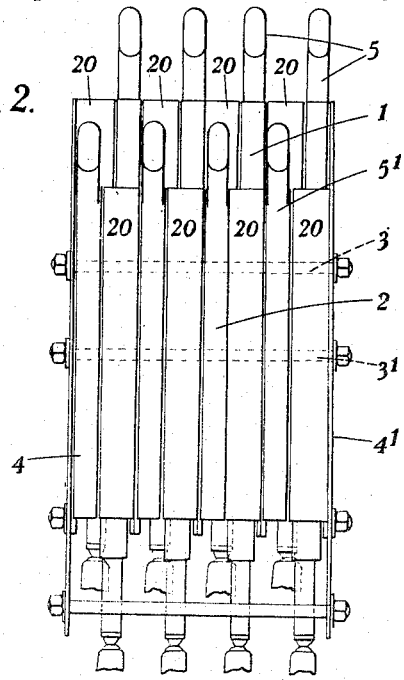
Figure 4:
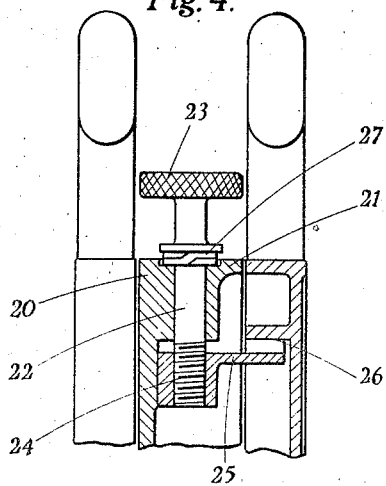

According to a further feature of the present invention means are provided for braking each movable wheel so that when the pilot moves his hand from one handle to another, the wheel will remain in the same position. Suitable means for this purpose are illustrated in Figure 3, and in greater detail, in Figure 4. The means comprise fixed members 20 each having a flange 21 and each being disposed adjacent to one face of each rotatable wheel 1, 2. In the case of groups of wheels mounted on a common spindle the arrangement will therefore be as shown in Figure 2 in which the fixed members 20 alternate with the operating wheels 1 or 2. The flange 21 of each fixed member 20 is provided with an enlargement drilled radially to receive a spindle 22 furnished at its outer end with a knob 23 and at its inner end with a thread 24 on which is mounted a friction member 25, the outwardly projecting portion of which is adapted to bear against the inner face of a flange 26 on the spoked wheel. An elastic washer or spring 27 is interposed between the knob 23 and the periphery of the fixed member in order that the degree of friction may be varied as desired.

Figure 5:
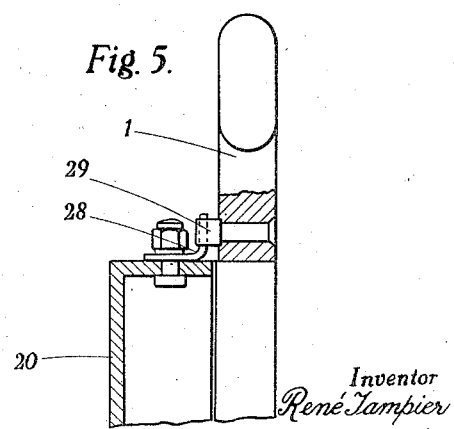

To provide means for enabling the movement of each rotatable wheel to be arrested at any desired point, the fixed members 20 may each be provided (Figures 3 and 5) with an adjustable stop 28 with which pins 29 on the rotatable wheels 1, 2 are adapted respectively to coact. As it may be desired to move the rotatable wheel past this point of arrestment, each pin 29 is mounted on a spindle 30 slidably mounted on the end of a handle 5, 5¹ (see Figure 7) said spindle being maintained in its outer position by a spring 31. The arrangement is such that when it is desired to release one of the handles past the stop 28, the handle part 30 is depressed, the pin being thereby pushed inwardly below the stop 28 on the fixed wheel.

According to a further feature of the invention, means may be provided for simultaneously operating two controls either in the same direction or differentially. For example in certain types of aircraft, it may be desired to accelerate simultaneously two engines mounted at an equal distance from the fuselage, or it may be desired to control the extreme outer engines differentially (for example during slow-running or taxiing) by moving the handles on one wheel forwards and the handles on the other or adjacent wheel backwards with the same hand; as the distance between the two handles may be too great for this latter operation, the fixed members 20 disposed between the spoked wheels may each be provided with a support 33 furnished with a radially disposed bore 34 in which a spindle 35 provided with a pinion 36 is adapted to slide against the action of a spring 37 (Figure 6). The spoked wheels are provided with toothed quadrants or wheels 38 extending over the relevant range of the particular control, with two of which a pinion 36 on a fixed member 20 is adapted to coact. When the pinion 36 is in its outer or normal position (as shown in Figure 6) the spoked wheels may be moved independently of each other in either direction or together in the same direction, but when the pilot desires to obtain a differential movement, the spindle 35 carrying the pinion 36 which is furnished with a suitable handle 39 is depressed to bring the pinion 36 into engagement with the toothed quadrants or wheels 38. The handle on the spindle 35 is then turned on its own axis and rotates the two wheels in opposite directions.

When the pilot removes his hand the differential gear is automatically disconnected by the spring 37.

Figure 8A:
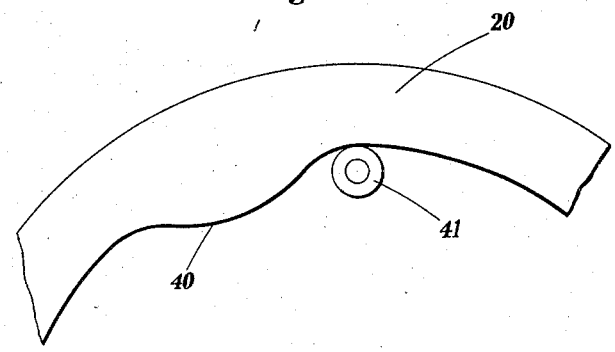

In cases such as shown in the drawings where spoked control wheels are mounted on separate parallel spindles 3, 3¹ arranged in close proximity to each other, the handles on the spoked wheels are preferably arranged, as shown in Figures 8, 8a, so that they may be automatically shortened as the handles on one wheel pass any other member in their path. To this end the fixed member 20 is furnished with a cam surface 40 with which a small wheel or roller 41 mounted on the inner end of the spring-pressed handle 42 slidably arranged as described with reference to Figure 7 is adapted to coact and draw the handle 42 inwardly against its spring at the predetermined position.

Figure 9:
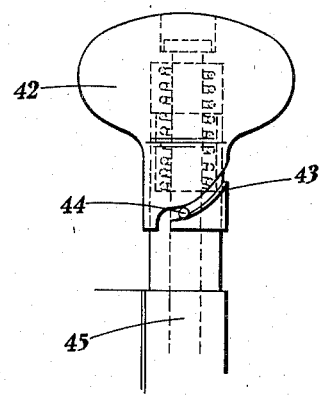
Figure 9A:
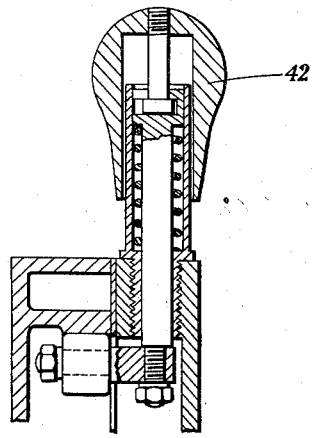

In view of the limited space available it is desirable to arrange the control wheels as close to each other as possible, but as the knobs on the handles are preferably wider in one direction than the other it is advantageous to arrange said handles so that they are free to turn through an angle of 90° in order that when in use the wide surface and, when not in use, the narrow surface, is presented to the pilot. A suitable arrangement is shown in Figures 9, 9a in which the handle 42 is furnished with a spiral cam slot 43 with which a pin 44 on the spindle 45 on which the handle 42 is slidable longitudinally is adapted to engage, the arrangement being such that when the spindle 45 is drawn down by the cam slot the handle 46 is turned through an angle of 90°.

In a device made according to the invention it will be evident that the hand wheels can be turned through 360° or more and consequently for a given length of lever the operator can obtain a mechanical advantage relatively to known arrangements in which as above stated the angular movement of the control lever does not normally move through an angle exceeding 90°. The accuracy of a control according to the invention can by reason of this larger operating cycle, also be greater.

What I claim is:

1. In a device for actuating controls on aircraft, a shaft arranged at right angles to the longitudinal axis of the machine, a plurality of hand wheels, each operating a separate control, mounted on said shaft, means for operating each of said hand wheels in a stepwise manner, said means comprising a plurality of operating handles projecting radially from each of said hand wheels, a fixed member disposed adjacent to each rotatably mounted operating member, and an operating connection between each rotatably mounted operating member and a controlled element for transmitting the rotary movement of the said operating member as a linear movement.

2. In a device according to claim 1 means comprising a friction element supported on each fixed member and arranged to act as a brake on the adjacent hand wheel for holding said member in a position into which it is moved.

3. In a device according to claim 1 a stop carried on a fixed member, adapted to co-operate with a stop carried on the adjacent hand wheel in order to arrest the movement of the said hand wheel at a desired point.

4. In a device according to claim 1 a stop carried on a fixed member, adapted to co-operate with a stop carried on the adjacent hand wheel in order to arrest the movement of the said hand wheel at a desired point, in combination with means for releasing the stop-mechanism, these means comprising a slidable point on the hand wheel, by means of which the stops are brought out of alignment.

5. In a device according to claim 1, means for simultaneously operating two controls differentially.

6. In a device according to claim 1, means for simultaneously operating two controls differentially comprising gear teeth on two adjacently disposed hand wheels, an intermediate gear slidably and rotatably mounted on the fixed member disposed between the said two hand wheels, and means for bringing the said intermediate gear into mesh with the said gear teeth, whereby rotation of the intermediate gear causes the said two hand wheels to rotate in opposite directions.

7. In a device according to claim 1 radially slidable handles to the hand wheels and means for automatically sliding the handles inwardly when they reach a predetermined position.

8. In a device according to claim 1 radially slidable handles to the hand wheels and means for turning the said handles through an angle of 90° when they are slidden inwardly.

9. In a device according to claim 1 radially slidable handles to the hand wheels, means for automatically sliding the handles inwardly when they reach a predetermined position, and means comprising a pin and cam slot connection for rotating the handles through an angle of 90° when they are slidden inwards.

10. In a device according to claim 1 an operating connection between each hand wheel and its controlled element comprising a toothed member and a cylindrical rack, an eccentric casing in which the rack is mounted, and means for turning the eccentric casing relatively to the rack, whereby any backlash between the rack and the toothed member can be taken up by relative rotation between the rack and the eccentric casing.

11. In a device according to claim 1 an indicating device operatively associated with a hand wheel.

RENÉ TAMPIER.